(12) United States Patent
Daly et al.

(10) Patent No.: US 9,882,493 B2
(45) Date of Patent: Jan. 30, 2018

(54) APPARATUS AND METHOD FOR ISOLATED CURRENT MODE CONTROLLER

(71) Applicant: Analog Devices, Inc., Norwood, MA (US)

(72) Inventors: Michael Daly, San Jose, CA (US); Gabriele Bernardinis, Los Gatos, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/146,635

(22) Filed: May 4, 2016

(65) Prior Publication Data

US 2016/0336862 A1 Nov. 17, 2016

Related U.S. Application Data

(60) Provisional application No. 62/162,454, filed on May 15, 2015.

(51) Int. Cl.
  *H02M 3/335* (2006.01)
  *H02M 1/36* (2007.01)
  *H02M 1/00* (2006.01)

(52) U.S. Cl.
  CPC ......... *H02M 3/33507* (2013.01); *H02M 1/36* (2013.01); *H02M 2001/0009* (2013.01)

(58) Field of Classification Search
  CPC ..... H02M 3/33507; H02M 2007/4815; H02M 2007/4818; H02M 1/083; H02M 3/33538; H02M 3/33546; H02M 3/33515

(Continued)

(56) References Cited

U.S. PATENT DOCUMENTS 6,807,075 B2  10/2004  Miermans
7,906,917 B2   3/2011  Tripathi et al.

(Continued)

OTHER PUBLICATIONS

"Chapter 2—Basics of Sigma-Delta Modulation", In: Look-Ahead Based Sigma-Delta Modulation, Janssen, E., et al., Springer Science+Business Media B.V., (2011), 5-28.

(Continued)

*Primary Examiner* — Adolf Berhane
*Assistant Examiner* — Afework Demisse
(74) *Attorney, Agent, or Firm* — Schwegman Lundberg & Woessner, P.A.

(57) ABSTRACT

A soft start-up method is provided comprising: producing an initialization signal on a primary winding side of a transformer; using a comparison of the initialization signal with a signal having a value indicative of a current in the primary winding to control a switch operatively disposed between a voltage source and the primary side; transmitting the initialization signal over a galvanically isolating communication medium from the primary side to a secondary winding side of a transformer; at the secondary winding side, comparing a reference voltage signal with a secondary winding output voltage signal; in response to a match between the reference signal and the secondary winding output voltage signal, transmitting a comparison voltage signal over the galvanically isolating communication medium from the secondary side to the primary side; at the primary side, comparing the initialization signal with the transmitted comparison voltage signal; and in response to a match between the initialization signal the and the comparison voltage signal, using the transmitted comparator voltage signal to control the switch.

25 Claims, 10 Drawing Sheets

(58) Field of Classification Search
USPC .......................................... 363/21.01–21.18
See application file for complete search history.

(56) References Cited

U.S. PATENT DOCUMENTS

| | | | |
|---|---|---|---|
| 8,502,420 B1* | 8/2013 | Mogilevski | H02M 3/33561 |
| | | | 307/151 |
| 2009/0237280 A1 | 9/2009 | Ashmore, Jr. | |
| 2010/0156686 A1 | 6/2010 | Kim et al. | |
| 2012/0294048 A1 | 11/2012 | Brinlee | |
| 2015/0280576 A1* | 10/2015 | Hinz | H02M 3/33507 |
| | | | 363/21.15 |
| 2016/0126968 A1 | 5/2016 | Lesso et al. | |
| 2016/0336957 A1 | 11/2016 | Bernardinis et al. | |

OTHER PUBLICATIONS

Baker, Bonnie, "How delta-sigma ADCs work, Part 1", Analog Applications Journal, (c) 2011, Texas Instruments Incorporated, (2011), 6 pgs.

"U.S. Appl. No. 15/146,647, Non Final Office Action dated Jun. 6, 2017", 19 pgs.

* cited by examiner

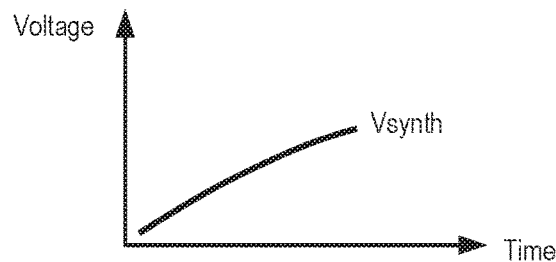
FIG. 5
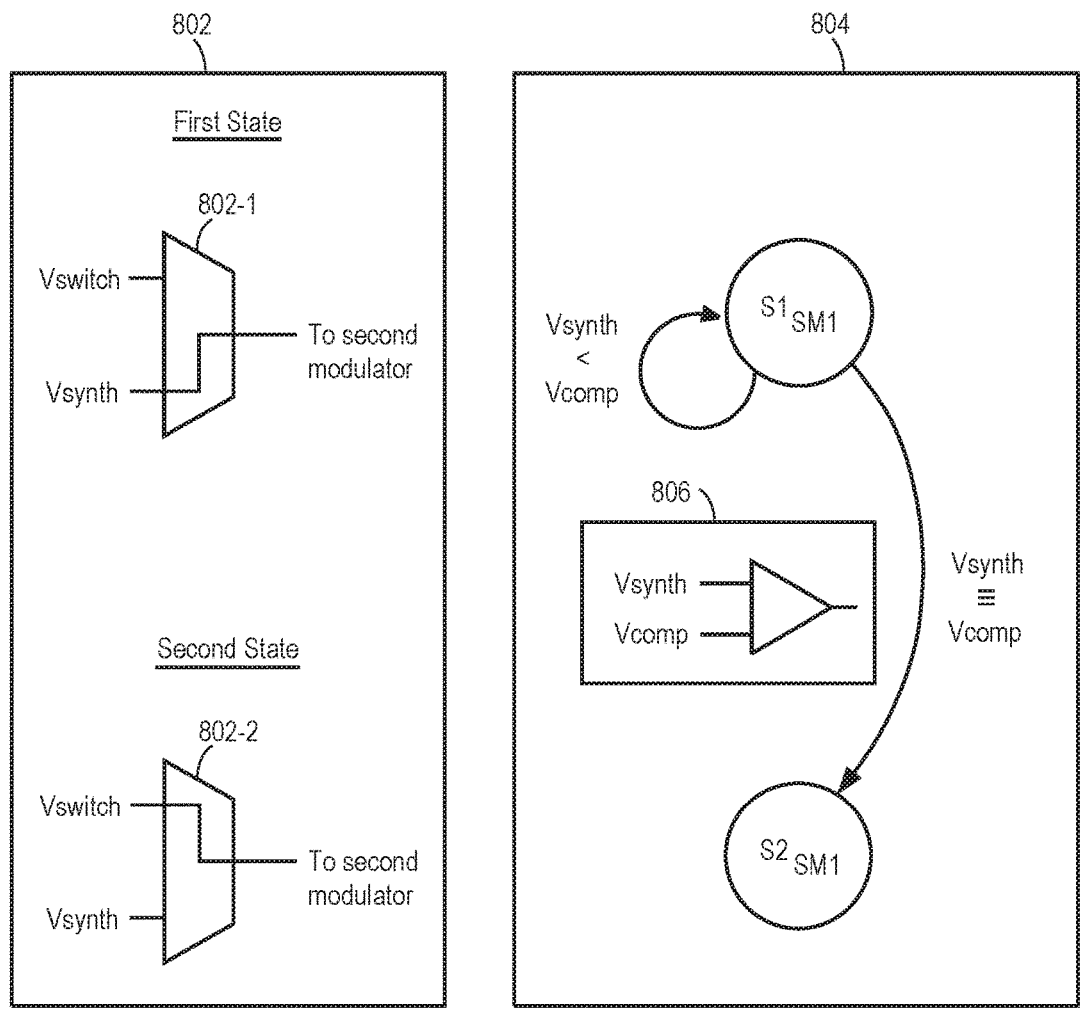
FIG. 8A
FIG. 8B

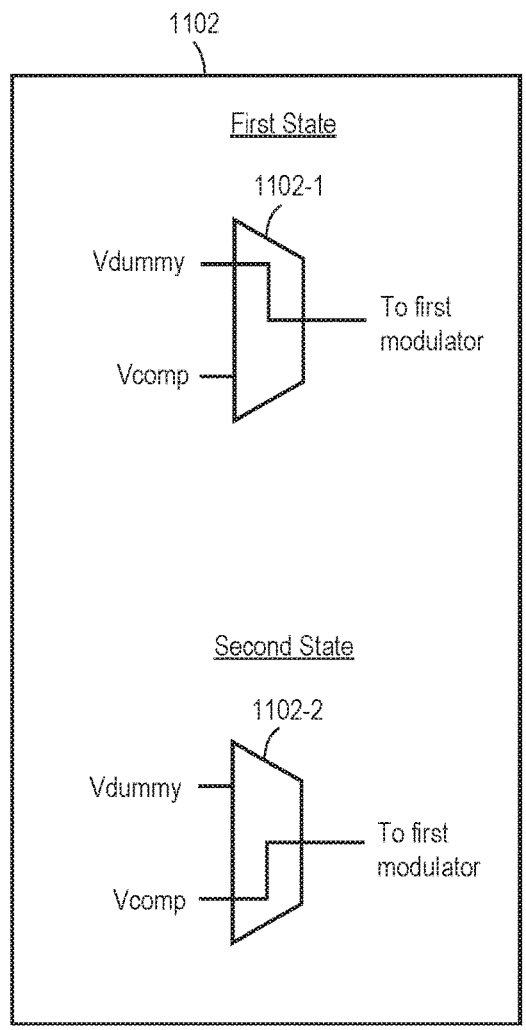
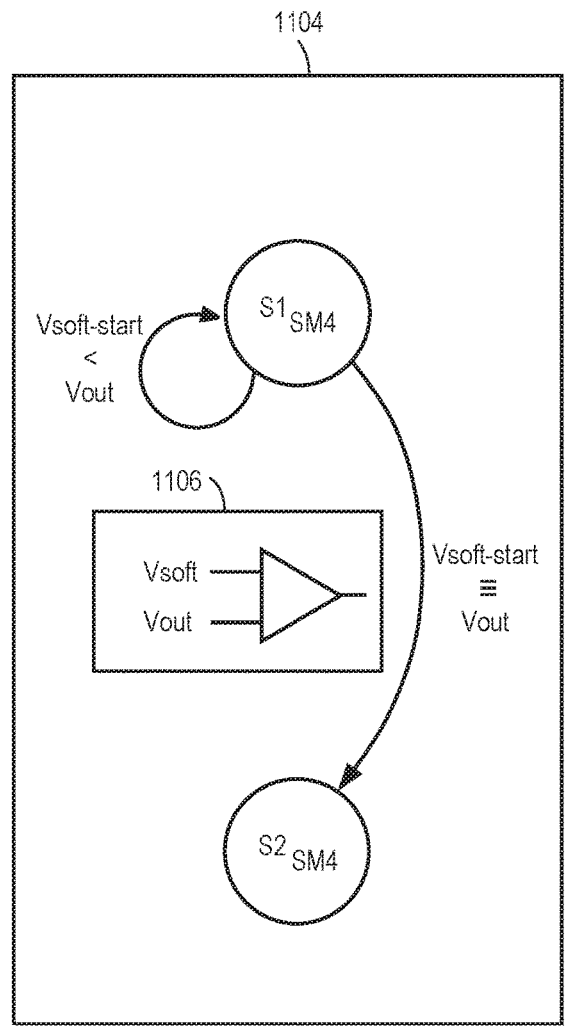
FIG. 11A
FIG. 11B

APPARATUS AND METHOD FOR ISOLATED CURRENT MODE CONTROLLER

CLAIM OF PRIORITY

This application claims the benefit of priority to U.S. Provisional Patent Application Ser. No. 62/162,454, filed May 15, 2015, which is incorporated herein by reference in its entirety.

BACKGROUND

A flyback converter circuit includes a transformer configured to provide voltage conversion, with galvanic isolation, between an input voltage and an output voltage. Flyback converters have been used both for AC/DC and DC/DC voltage conversion. Galvanic isolation is commonly used for circuit safety purposes, to isolate two or more electric circuits that must communicate, but that have grounds that may be at different potentials. It also can be an effective technique to prevent unwanted current from flowing between electrical components sharing aground conductor.

FIGS. 1A-1B are illustrative circuit diagrams representing a known flyback converter 102 in an on-state (FIG. 1A) and an off-state (FIG. 1B). A primary side 104 of the flyback converter 102 includes an input voltage source $Vi_n$, a transformer primary winding 108 and a switch 110 to controllably couple and decouple the input voltage $V_{in}$ to and from the primary winding 108. A secondary side 112 of the converter 102 includes a transformer secondary winding 114, a capacitor 116 coupled in parallel with the secondary side winding 114, and a diode coupled 118 to permit unidirectional current flow between the secondary winding 114 and the capacitor 116. An output load 120 is coupled in parallel with the capacitor.

Referring to FIG. 1A, when the switch 110 is closed, the primary winding 108 is directly coupled to the input voltage source $V_{in}$. A current within the primary winding 108 and magnetic flux in the transformer, which includes the primary and secondary windings, increases gradually, storing energy in the transformer. A voltage induced in the secondary winding 114 is negative, so the diode 118 is reverse-biased (i.e., blocked) and no current flows in the secondary winding 114. During a time interval while the switch 110 is closed, the capacitor 116 supplies energy to an output load 120.

Referring to FIG. 1B, when the switch 110 is open, the primary winding 108 is decoupled from the input voltage source $V_{in}$. Current within the primary winding 108 and magnetic flux drop. A voltage induced in the secondary winding 114 is positive, resulting in forward-bias of the diode 118, which allows current to flow from the secondary winding 114 to charge the capacitor 116. Energy transferred from the transformer thereby recharges the capacitor 116, which supplies an output voltage to the load 120.

Often, an electrically isolated communication medium (not shown) is used to transmit control signals between control circuitry disposed on a primary side 104 of the converter 102, and control circuitry disposed on a secondary side 112 of the converter 102. The control signals ordinarily are used to control timing of the opening and closing of the switch 110 so as to regulate voltage conversion to maintain a desired output voltage level, for example. The electrically isolated communication medium may include opto-couplers, an inductive couplers, or capacitive couplers, for example.

SUMMARY

A circuit soft start-up method is provided. An initialization signal is provided on a primary winding side of a transformer. At the primary winding side. The initialization signal is compared at the primary winding side with a signal having a value indicative of a current in the primary winding to control a switch operatively disposed between a voltage source and the primary side winding. The initialization signal is transmitted over a galvanically isolating communication medium from the primary side to a secondary winding side of a transformer. At the secondary winding side, a reference signal is compared with a secondary winding output voltage signal. In response to a match between the reference signal and the secondary winding output voltage signal, a comparison voltage signal is transmitted over the galvanically isolating communication medium from the secondary winding side to the primary winding side. At the primary winding side, the initialization signal is compared with the transmitted comparison voltage signal. In response to a match between the initialization signal the and the transmitted comparison signal, the transmitted comparison signal is used to control the switch.

BRIEF DESCRIPTION OF THE DRAWINGS

FIG. 5 shows an illustrative voltage curve representing an initialization signal in accordance with some embodiments.

FIGS. 8A-8B are illustrative drawings representing selection circuitry of a first state machine in a first selection state and in a second selection state (FIG. 8A) and a corresponding state transition diagram representing decision criteria for transition from the first state to the second state (FIG. 8B) in accordance with some embodiments.

FIGS. 11A-11B are illustrative drawings representing a fourth logic circuit state machine that includes fourth selection circuitry that transitions from a first selection state to a second selection state (FIG. 11A) and a corresponding state transition diagram representing decision logic circuitry for determining when to transition from the first state to the second state (FIG. 11B) in accordance with some embodiments.

DESCRIPTION OF EMBODIMENTS

Figure 1A:
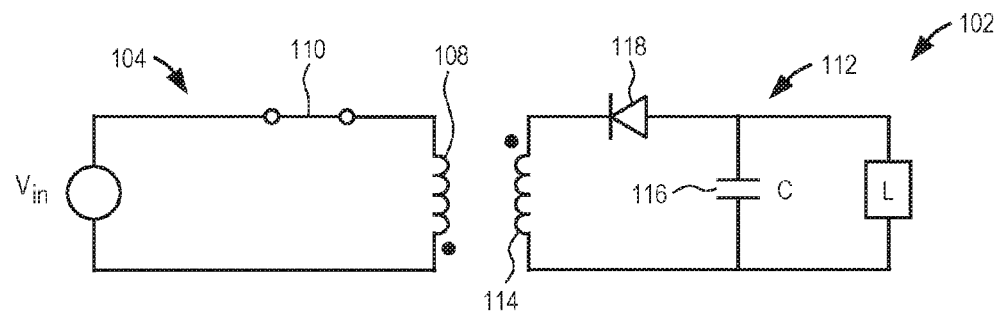
FIGS. 1A-1B are illustrative circuit diagrams representing a known flyback converter in an on-state (FIG. 1A) and an off-state (FIG. 1B).
Figure 1B:
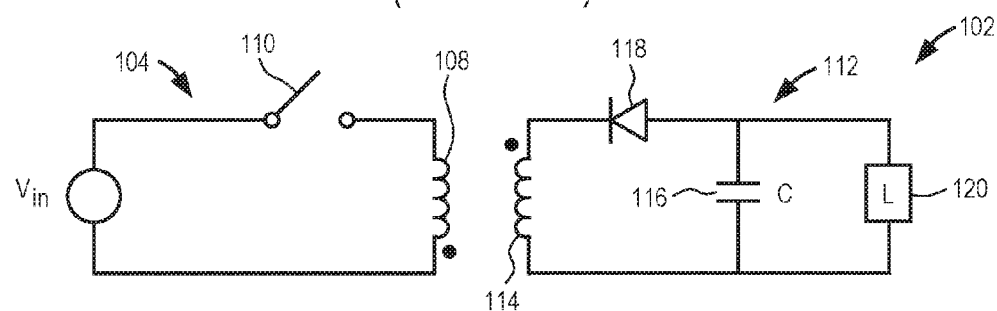

The following description is presented to enable any person skilled in the art to create and use an isolated current mode with improved startup transition control circuitry. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Flow diagrams in drawings referenced below are used to represent processes. Thus, the present invention is not intended to be limited to the embodiments shown, but is to be accorded the widest scope consistent with the principles and features disclosed herein.

A. Circuit Configuration in the Steady State Operation Mode

Figure 2:
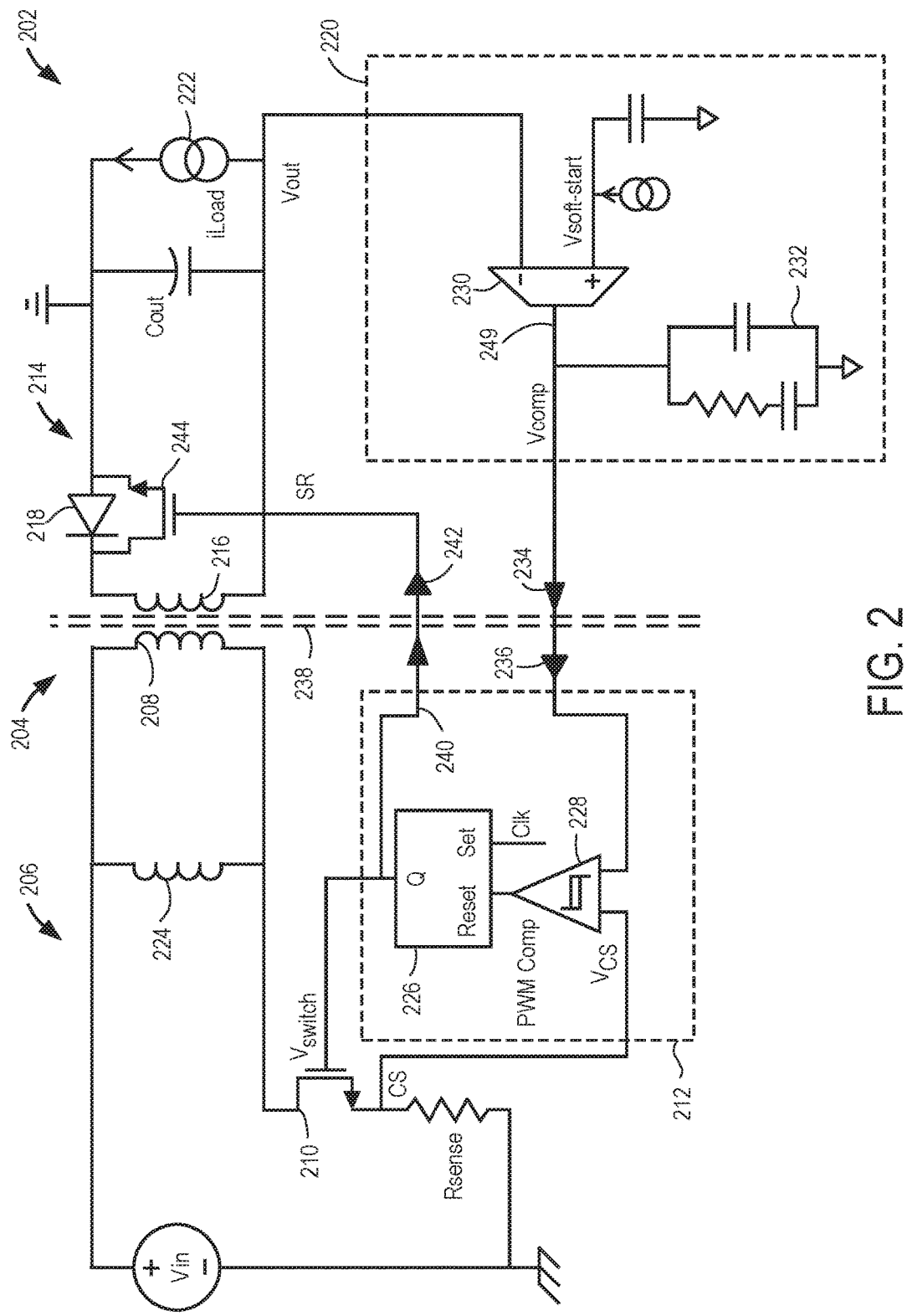
FIG. 2 is an illustrative circuit diagram representing configuration of an isolated current mode controller during steady state operation in accordance with some embodiments.

FIG. 2 is an illustrative circuit diagram representing configuration of an isolated current mode controller 202 during steady state operation in accordance with some embodiments. The controller 202 includes a transformer 204. The controller 202 includes a primary side 206 that includes the transformer's primary winding 208, an input voltage source $V_{in}$, a first switch circuit 210, and primary side first switch control circuitry 212. The controller 202 includes a secondary side 214 that includes the transformer's secondary winding 216, an output capacitor $C_{out}$, a diode 218, and secondary side output voltage level feedback control circuitry 220. The primary winding 208 is controllably coupled to and decoupled from the input voltage $V_{in}$ to induce a current in the transformer's secondary winding 216 to charge the output capacitor $C_{out}$. The secondary winding 216 is coupled in parallel with the capacitor $C_{out}$, which is coupled in parallel with an external load circuit 222. The diode 218 is coupled in series with the secondary winding 216 and the output capacitor $C_{out}$ to provide a one-way current for use to charge the output capacitor $C_{out}$ to an output voltage level $V_{out}$ required to drive the load 222 circuitry.

Figure 3A:
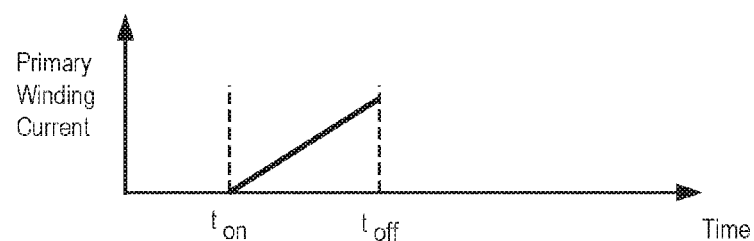
FIGS. 3A-3B are illustrative drawings representing current flow in the transformer primary winding (FIG. 3A) and secondary winding (FIG. 3B), respectively, in response to opening and closing the switch in accordance with some embodiments.
Figure 3B:
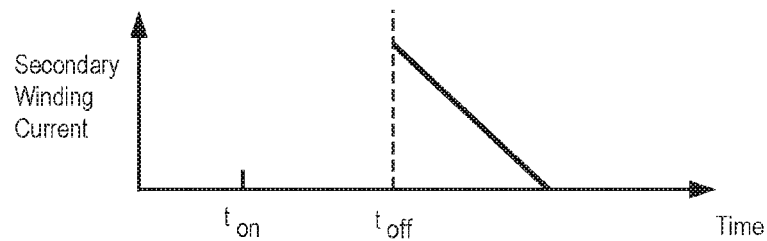

FIGS. 3A-3B are illustrative drawings representing current flow in the transformer primary winding 208 (FIG. 3A) and secondary winding 216 (FIG. 3B), respectively, in response to opening and closing the first switch 210 in accordance with some embodiments. Preferably, the first switch control circuitry 212 controls turn-on of the first switch 210 at time tort and turn-off of the first switch 212 at time $t_{off}$ in response to a feedback control signal, labeled $V_{comp}$. Turn-on (closing) of the first switch 212 couples the input voltage source $V_{in}$ to the primary winding 208 so as to cause an increasing current in the primary winding 208, e.g., approximating an increasing ramp current, as represented by the primary winding current curve during the time interval between times, $t_{on}$ and $t_{off}$ in FIG. 3A. It will be appreciated that the transformer 204 includes parasitic inductance 224 that results in the gradual, as opposed to instantaneous, increase in current. As shown in FIG. 3B, a resulting voltage induced in the secondary winding 216 is negative, so that the diode 218 is reverse-biased (i.e., blocked), and no current flows in the secondary side 214 while the first switch 212 couples the primary winding 208 to $V_{in}$. Turn-off (opening) of the first switch 212 at time $t_{off}$ decouples the input voltage $V_{in}$ from the primary winding 208 resulting in a drop in the primary winding current and a drop in magnetic flux. Voltage across secondary winding 216 is positive, forward-biasing the diode 218, and as shown in FIG. 3B, allowing a decreasing current induced in the secondary winding 216, e.g., approximating a decreasing ramp current, to flow from the secondary winding 216 to charge the output capacitor $C_{out}$.

More specifically, in some embodiments, the input voltage source $V_{in}$ has a positive (plus) terminal coupled to a first terminal of the primary winding 208 and a negative (minus) terminal coupled to ground. The first switch 212 includes a transistor circuit. In some embodiments, the first switch 212 includes a first FET device having a drain operatively coupled to a second terminal of the transformer's primary winding 208 and a source operatively coupled to a first terminal of a resistor $R_{sense}$. A second terminal of the resistor $R_{sense}$ is operatively coupled to the negative terminal coupled of $V_{in}$, which preferably is at ground. A gate of the first switch transistor 212 is operatively coupled to receive a switch control signal $V_{switch}$.

The switch control circuitry 212 includes a logic circuit 226, a current sense device ($R_{sense}$), and a comparator circuit 228. Preferably, the logic circuit 226 produces the switch control signal $V_{switch}$ having one of either a turn-on logic state or a turn-off logic state. The current sense device $R_{sense}$ produces a first signal, a current sense (CS) signal, indicative of a value of current in the primary winding 208. With the controller 202 configured for steady state operation as represented in FIG. 2, the comparator circuit 228 produces a comparison signal indicative of a comparison between a value of the CS signal, which is indicative of current in the primary winding 208 and a value of the feedback control signal $V_{comp}$. The logic circuit 226 determines the state of switch control signal $V_{switch}$ in response to the comparison signal.

In some embodiments, the logic circuit 226 includes a latch circuit that is operatively coupled to change logic state in response to changes in an output signal produced by the comparator circuit 228. More specifically, in some embodiments, the logic circuit 226 includes an RS latch having a reset input node operatively coupled to receive an output signal produced by the comparator circuit 228, having a set input node operatively coupled to receive a clock signal, and having a Q output node operatively coupled to provide the switch control signal $V_{switch}$ to the first switch circuitry 210.

In some embodiments, the $R_{sense}$ resistor acts as the current sense device. When the first switch is turned on (closed), current in the primary winding 208 gradually increases, e.g., ramps up. As shown in FIG. 3B, a rate of current increase in the primary winding may be approximated as a ramp curve, for example. With the first switch 210 turned on (closed), a current sense (CS) voltage, $V_{CS}$, across resistor $R_{sense}$ increases with increasing current in the primary winding 208.

Referring to FIG. 2, the comparator circuit 228 includes first and second input nodes to respectively receive the $V_{CS}$ signal and $V_{comp}$ signal, respectively, during steady state operation. The comparator circuit 228 provides a signal to determine a switch time interval between times tort and $t_{off}$ based upon a comparison of $V_{CS}$ and $V_{comp}$. In some embodiments, the comparator circuit 228 produces a comparator output signal that is indicative of the comparative values of $V_{CS}$ and $V_{comp}$. In some embodiments, the comparator circuit 228 produces a comparator output signal having a first value in response to determining that $V_{CS}$ is less than $V_{comp}$ and produces a comparator output signal having a second value in response to determining that $V_{CS}$ is greater than $V_{comp}$. More specifically, in some embodiments, the comparator circuit provides comparator output signal to the latch circuit reset node that changes state in response to the value of $V_{CS}$ crossing the value of $V_{comp}$, which corresponds to occurrence of a peak current value in the primary winding 208. Alternatively, for example, a comparator circuit 228 can be used that produces an output signal indicative of comparative values of $V_{comp}$ and an average current value in the primary winding 208 or a trough current in the primary winding 208.

The output voltage level feedback circuitry 220 includes an amplifier circuit 230 that produces a continuous time varying amplifier output signal $V_{comp}$, which during steady state operation, has a value that is indicative of the value of $V_{out}$, across the load 222. Preferably, the amplifier circuit 230 is configured as a difference amplifier circuit that produces a difference signal that is indicative of difference between an output signal $V_{out}$ produced across the output capacitor $C_{out}$ and a reference value $V_{ref}$. Alternatively, in some embodiments, an operational amplifier circuit (not shown) can be used to produce an amplifier output signal that is indicative of a value of the voltage level of $V_{out}$ based upon a reference value.

More specifically, in some embodiments, the amplifier circuit 230 is implemented as a difference amplifier that includes a transconductance amplifier (also referred to as a "gm amplifier") that includes a first input node coupled to receive $V_{out}$ and a second input node coupled to receive a reference voltage $V_{ref}$ and that includes an output node, that produces a continuous current signal, which during steady state operation represented in FIG. 2, has a value indicative of the difference between $V_{out}$ and $V_{ref}$. In some embodiments, the $V_{ref}$ voltage is produced using an $I_{ref}$ reference current source and a reference capacitor $C_{ref}$ that are coupled to the second input node of the difference amplifier. During steady state operation, the $I_{ref}$ reference current source charges the reference capacitor $C_{ref}$ a voltage level $V_{ref}$. During steady state operation, the output of the amplifier is coupled to an electrical conductor path 250. An integrating capacitor circuit 232 coupled to the conductor path 250 is charged to produce the feedback voltage signal $V_{comp}$ on the conductor path 250 based upon the amplifier output current signal. In some embodiments the integrating capacitor circuit 232 is configured to act as a type II compensation network that provides compensation to avoid unwanted oscillation and to ensure feedback loop stability.

The controller 202 includes first modulator circuitry 234 disposed on the secondary side 214 and first demodulator circuitry 236 disposed on the primary side 206 that are coupled via a galvanically isolating communication medium 238. The first modulator circuitry 234 and the first demodulator circuitry 236 may be referred to herein as the first transmission circuitry 237. During steady state operation, a conductor path 250 couples the output of the amplifier circuit 230 to an input of the first modulator 234. During steady state operation, the first modulator 234 disposed on the secondary side 214 transmits the continuous time varying $V_{comp}$ feedback signal over the transmission medium 238 to the first demodulator 236 disposed on the primary side 206. The first modulator 234 converts a continuous time varying analog $V_{comp}$ feedback signal to a pulse width modulated (PWM) signal for transmission over the communication medium 238 to the first demodulator 236, which converts the PWM representation of the $V_{comp}$ signal back to an analog representation of $V_{comp}$ for provision to the comparator circuit 228.

The controller 202 includes second modulator circuitry 240 disposed on the primary side 206 and second demodulator circuitry 242 disposed on the secondary side 214 that are coupled, via the galvanically isolating communication medium 238, to communicate the switch control signal $V_{switch}$ from the Q output node of the latch 226 to the gate of a second FET 244. The second modulator circuitry 240 second demodulator circuitry 242 may be referred to herein as second transmission circuitry 243. In accordance with some embodiments, during steady state operation, the second modulator 240 converts the binary switch signal $V_{switch}$ to a pulse width modulated (PWM) signal for transmission over the communication medium 238 to the second demodulator 242, which converts the PWM representation of the switch signal $V_{switch}$ to an analog representation for provision to control turn-on and turn-off of the second switch 244.

The controller 202 also includes the second switch 244 coupled to provide a current path, during steady state operation represented in FIG. 2, that periodically circumvents the diode 218. During steady state operation, the second switch 244 is alternately turned-on (closed), enabling the current path, and turned-off (opened), disabling the current path, in response to the switch control signal $V_{switch}$. An advantage of the current path provided using the second switch 244 is to reduce the power loss in the diode 218 by diverting current around it in a lower resistance path. More particularly, in some embodiments, the second switch 244 includes a second FET device having a gate coupled to respond to the switch control signal $V_{switch}$.

B. Circuit Configuration in the Startup Operation Mode

Figure 4:
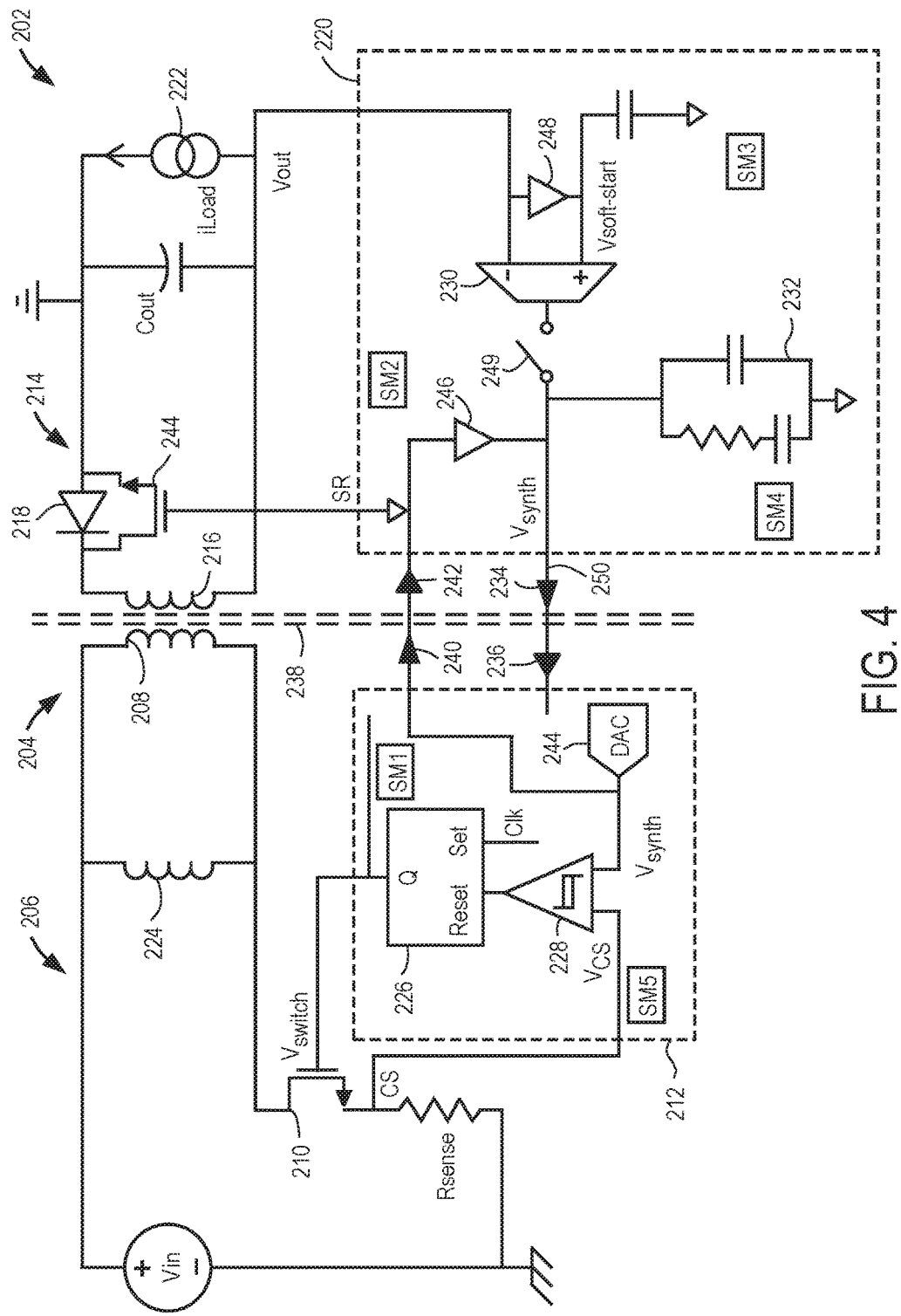
FIG. 4 is an illustrative circuit diagram representing configuration of an isolated current mode controller during startup operation in accordance with some embodiments.

FIG. 4 is an illustrative circuit diagram representing configuration of an isolated current mode controller 202 during startup operation in accordance with some embodiments. It will be appreciated that sonic of the circuit components shown in FIG. 4 are active only during startup and transition from startup to steady state operation, and have been omitted from FIG. 2 discussed above in order to simplify the drawings. The controller 202 includes a digital to analog converter (DAC) circuit 244 configured to generate an initialization signal, which in some embodiments includes a synthesized signal, $V_{synth}$ signal, a first initialization buffer circuit 246 and a second initialization buffer circuit 248. In some embodiments, the first initialization buffer circuit 246 includes a first unity gain amplifier circuit, and the second initialization buffer circuit 248 includes a second unity gain amplifier circuit. During controller startup, the first initialization buffer 246 receives an input signal indicative of the initialization signal, $V_{synth}$, voltage value and outputs a signal indicative of the initialization voltage value. During controller startup, the second initialization buffer 248 receives an input signal indicative of the $V_{out}$ voltage value and outputs a signal indicative of the $V_{out}$ voltage value. The controller 202 includes first state machine (SM1) control circuitry, second state machine (SM2) control circuitry, third state machine (SM3) control circuitry, fourth state machine (SM4) control circuitry, and fifth state machine (SM5) control circuitry. The state machines are used to control transition of the controller 202 from a startup mode operation to steady state mode operation. It will be appreciated that although the startup-to-steady-state transition control circuitry is described and shown as including five state machines, two or more of the state machines may be integrated together to operate as a logical unit.

The DAC circuit 244 is operative during startup to produce the synthesized initialization signal, $V_{synth}$. FIG. 5 shows an illustrative voltage curve representing the initialization signal in accordance with some embodiments. The DAC circuit produces an initialization signal waveform that gradually increases with time, e. g., comprises a ramp signal, so that it gradually increases the current delivered to the secondary side 214 slow enough to prevent over voltage on the output before the secondary side 214 achieves control of the loop.

During startup, represented in FIG. 4, the first buffer 240 is coupled to provide a voltage at its output, e.g., $V_{synth}$, to a conductor line 250 operatively coupled to provide an input signal of the first modulator 234. During startup operation, the output of the amplifier 230 is decoupled from the input to the first modulator 234. During startup, the signal provided by the first initialization buffer 246, which is acts during startup as a first voltage charging circuit, to charge the conductor 250 to a high enough voltage level to safely commence steady state feedback operation. More particularly, during startup, the second modulator 240 is coupled to convert the analog $V_{synth}$ signal produced by the DAC 244 to a PWM version and to transmit it over the communication medium 238 to the second demodulator 242. The second demodulator 242 converts the received PWM signal back to the analog $V_{synth}$ signal and provides it as an input to the first initialization buffer 246, which in turn, provides the $V_{synth}$ signal to the electrical conductor line 250 coupled to the input of the first modulator 234. In accordance with some embodiments, in operation, the conductor line 250, which is decoupled from the output of the amplifier 230, is charged to a voltage level that substantially equals $V_{synth}$ as the controller 202 transitions from startup mode of FIG. 4 to steady state operation mode of FIG. 2 the output of the amplifier 230 is re-coupled to the input of the first modulator 234. This allows a smooth change over from using a $V_{synth}$ feedback signal to using the $V_{comp}$ feedback signal, with minimal discontinuity in this critical control signal.

During startup, the second initialization buffer circuit 248 is coupled to provide the $V_{out}$ signal provided at its output to the second input node of the amplifier circuit 230. Switch 249 is initially opened during startup so as to decouple the output of the amplifier 230 from conductor 250. The second initialization buffer circuit 248 acts during startup as a second voltage charging circuit, to charge up a $V_{soft-start}$ starting reference voltage at the second (reference) node of amplifier 230 to the $V_{out}$ voltage level. More particularly, during startup, the second initialization buffer 248 receives $V_{out}$ at its input node and provides the received $V_{out}$ signal to the amplifier's second input node. The $V_{out}$ output signal provided by the second buffer is used to charge the amplifier's second input node to a high enough $V_{soft-start}$ starting reference voltage level to safely commence steady state operation. In accordance with some embodiments, the second input node is charged to a $V_{soft-start}$ starting reference voltage level that substantially equals the contemporaneous value of $V_{out}$ before the controller transitions from startup mode to steady state operation. This is to ensure that when the secondary side 214 takes over feedback control it does not try to either rapidly increase or decrease the output voltage $V_{out}$ from its current level.

C. Primary Side Startup Process

Figure 6:
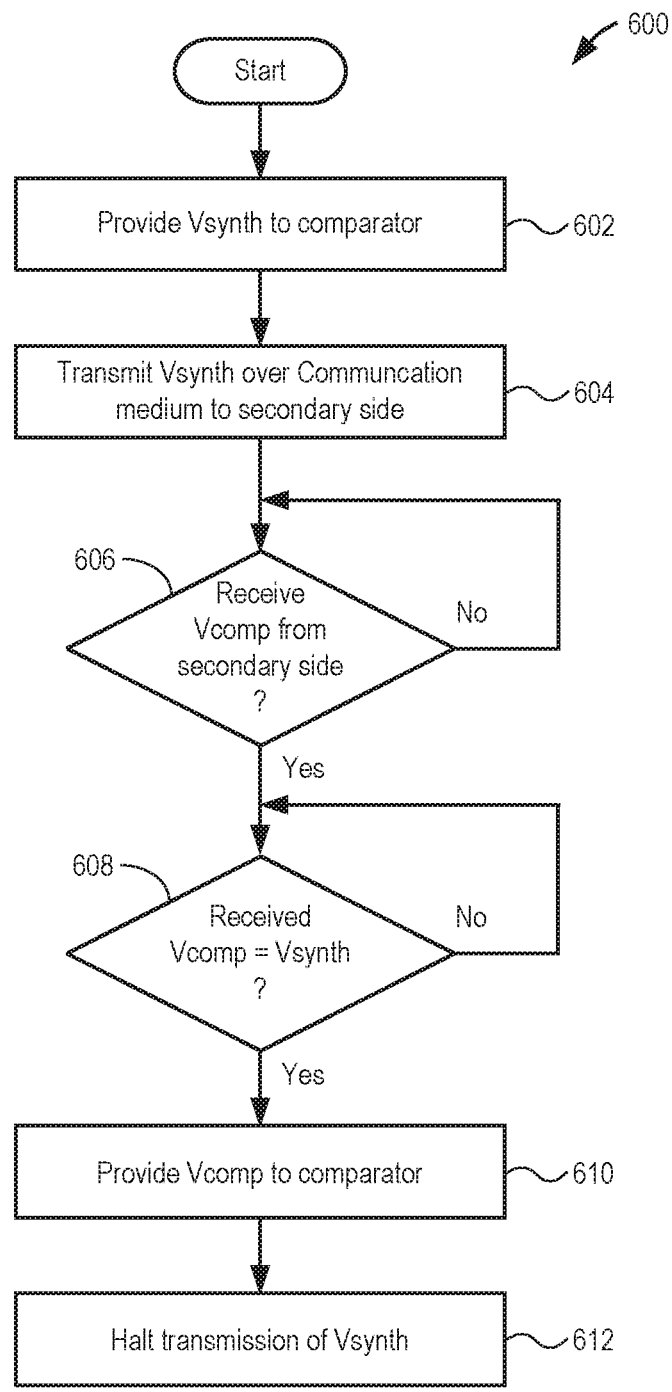
FIG. 6 is an illustrative flow diagram representing a primary side startup process in accordance with some embodiments.

FIG. 6 is an illustrative flow diagram representing a primary side startup process 600 in accordance with some embodiments. Modules in the flow diagram correspond to hardware or firmware used to perform the corresponding acts. In module 602, the $V_{synth}$ voltage signal is provided to the second input node of the comparator circuit 238. In module 604, the $V_{synth}$ voltage signal is transmitted over the communication path 238 to the secondary side 214. In decision module 606, a determination is made as to whether $V_{comp}$ is received over the communication channel 238 from the secondary side 214. As explained more fully below, in some embodiments, during a time interval during startup while the second input node of the amplifier 230 is being charged to the $V_{out}$ voltage level, a dummy signal $V_{dummy}$, i.e. a signal that is not recognized on the primary side as the $V_{comp}$ signal, is transmitted by the secondary side to the primary side. In response to a determination by decision module 606 that the $V_{comp}$ signal is received, decision module 608 determines whether the received $V_{comp}$ voltage level substantially equals the $V_{synth}$ voltage level, within an error margin selected based upon circuit safety. Conversely, in response to a determination that the $V_{comp}$ signal has not yet been received, decision module 606 continues to monitor and evaluate the received feedback signal provided on conductor path 250 provided by the secondary. In response to determination by decision module 608 that $V_{comp}$ matches $V_{synth}$ to within the circuit safety margin, module 610 couples the second input node of the comparator 228 to receive the $V_{comp}$ feedback signal transmitted by the secondary side 214 to the primary side 206, and module 612 halts transmission of $V_{synth}$ to the secondary side 214. Conversely, in response to a determination that $V_{comp}$ does not match $V_{synth}$, decision module 608 continues to monitor and evaluate the $V_{comp}$ feedback signal provided by the secondary side 214.

D. Secondary Side Startup Process

Figure 7:
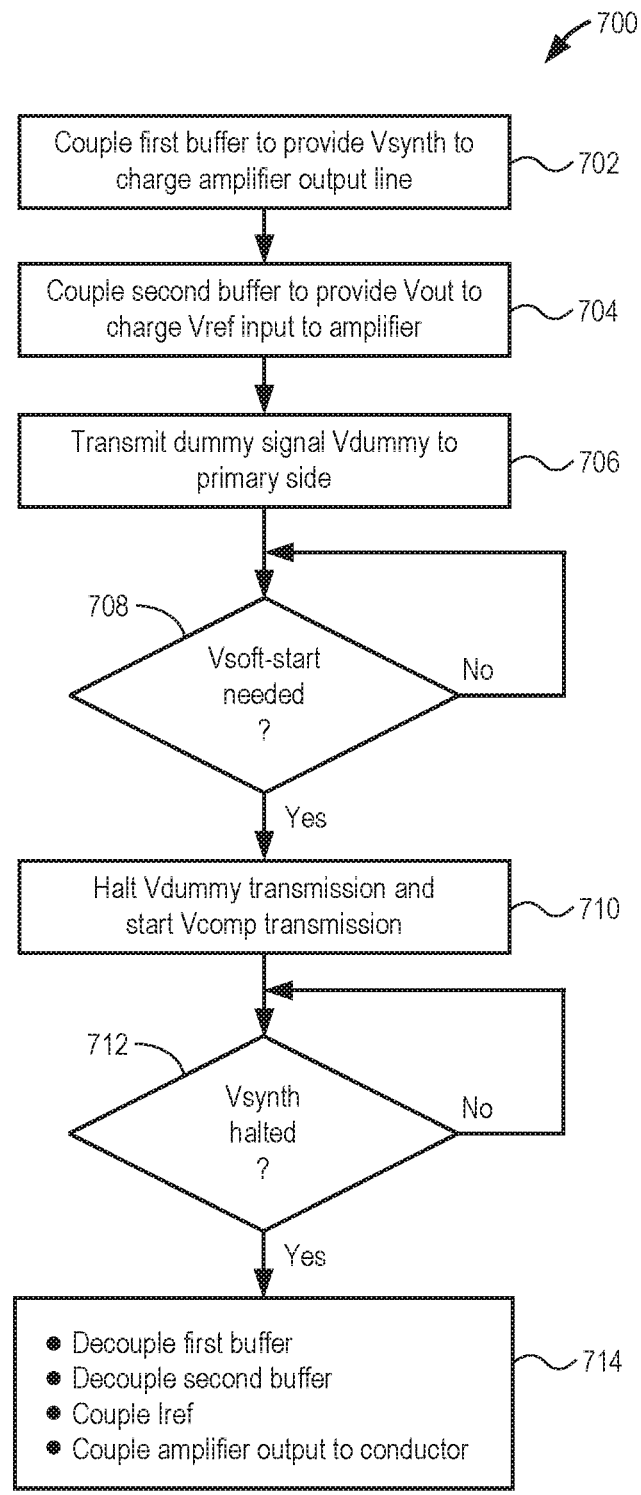
FIG. 7 is an illustrative flow diagram representing a secondary side startup process 700 in accordance with some embodiments.

FIG. 7 is an illustrative flow diagram representing a secondary side startup process 700 in accordance with some embodiments. Modules in the flow diagram correspond to hardware or firmware used to perform the corresponding acts. Module 702 couples the first initialization buffer 246 to provide $V_{synth}$ to charge the conductor line 250 line. Module 704 couples the second initialization buffer 248 to charge the second input node of the amplifier 230 to the $V_{out}$ voltage level. Module 706 couples the first modulator 234 to transmit a dummy feedback signal $V_{dummy}$ that preferably is not recognized by the primary side 204 as a valid $V_{comp}$ signal.

Decision module 708 determines whether a voltage at the second (reference) node of the amplifier 230 has reached a prescribed soft start voltage level, $V_{soft-start}$ level, which in some embodiments is substantially equal to $V_{out}$. In response to a determination that $V_{soft-start}$ voltage level has been reached, module 710 halts transmission of the $V_{dummy}$ signal and starts transmission of a signal $V_{comp}$, indicative of the voltage on line 250, to the primary side. It will be appreciated that at the moment that transmission of $V_{dummy}$ halts and transmission of $V_{comp}$ commences, the voltage value represented by $V_{comp}$ is a result of charging of line 250 using the $V_{synth}$ signal, which is received from the primary side. Conversely, in response to a determination by decision module 708 that the $V_{soft-start}$ voltage has not yet been received, decision module 708 continues to monitor and evaluate the signal the voltage at the second (reference) node of the amplifier 230. Decision module 712 determines whether the reception of $V_{synth}$ has halted. In response to a determination that $V_{synth}$ has halted, module 714 decouples the first initialization buffer 246 from receiving a signal output by the second demodulator 242; decouples the second buffer 248 from receiving the $V_{out}$ signal; couples the $I_{ref}$ current source to charge the reference capacitor $C_{ref}$; and close switch 249 to couple the output of the amplifier 230 to the conductor line 250. Conversely, in response to a determination by decision module 712 that the initialization signal, $V_{synth}$, continues to be received, decision module 714 continues to monitor and evaluate the signal received by the second demodulator 242 to determine whether the initialization signal, $V_{synth}$, transmission has ceased. Thus, it will be appreciated that even if a voltage level $V_{soft-start}$ has reached $V_{out}$, the amplifier 230 is blocked from participation in feedback control until steady state feedback control conditions are established. More particularly, it will be appreciated that the second initialization buffer 248 remains coupled to provide a $V_{out}$ signal value to the second input node of the amplifier 230 until steady state feedback control conditions are established. Moreover, the reference current $I_{ref}$ is not coupled to the second input node until a steady state feedback control condition is established. Thus, a voltage at the second node is prevented from rising past $V_{out}$ prior to establishing a steady state feedback control having been established. In accordance with some embodiments, a halt in the provision of the initialization, $V_{synth}$, signal indicates that steady state feedback control conditions have been established.

E. State Machines Used During Transition Between the Startup Operation Mode and the Steady State Operation Mode FIGS. 8A-8B are illustrative drawings representing a first logic circuit state machine (SM1) that includes first selection circuitry 802 that transitions from a first state 802-1 to a second state 802-1 (FIG. 8A) and a corresponding state transition diagram representing decision logic circuitry 804 for determining when to transition from the first state to the second state (FIG. 8B) in accordance with some embodiments. The first logic circuit state machine (SM1) is disposed on the controller's primary side 206, which powers up and provides the $V_{synth}$ signal immediately in response to the provision of the input voltage source $V_{in}$. Referring to FIG. 8A, the first state machine includes a first multiplex switch circuit that transitions from a first multiplex state 802-1 to a second multiplex state 802-2 during the controller's transition from startup mode operation to steady state mode operation. The multiplex circuit states 802-1, 802-2 include first and second input terminals that can be coupled, respectively, to receive the switch control signal $V_{switch}$ and to receive the synthesized signal initialization signal, $V_{synth}$. The multiplex circuit states 802-1, 802-2 include an output node coupled to output a selected signal from its input nodes to an analog signal input of the second modulator circuit for transmission to the secondary side. The first multiplex circuit is in the first multiplex state 802-1 when startup commences. Referring to FIG. 8B, state control logic $S1_{SM1}$ configures the first multiplexer state 802-1 to provide the initialization signal $V_{synth}$ to the second modulator while the initialization signal has a voltage $V_{synth}$ is less than $V_{comp}$. State control logic $S2_{SM1}$ includes a comparison circuitry 806 to compare $V_{synth}$ with $V_{comp}$ and to cause a transition to the second multiplexer state 802-2 in response to $V_{synth}$ matching $V_{comp}$ to within an acceptable circuit safety margin, e.g., a margin that is small enough that it will not cause a radical change in output voltage.

Figure 9A:
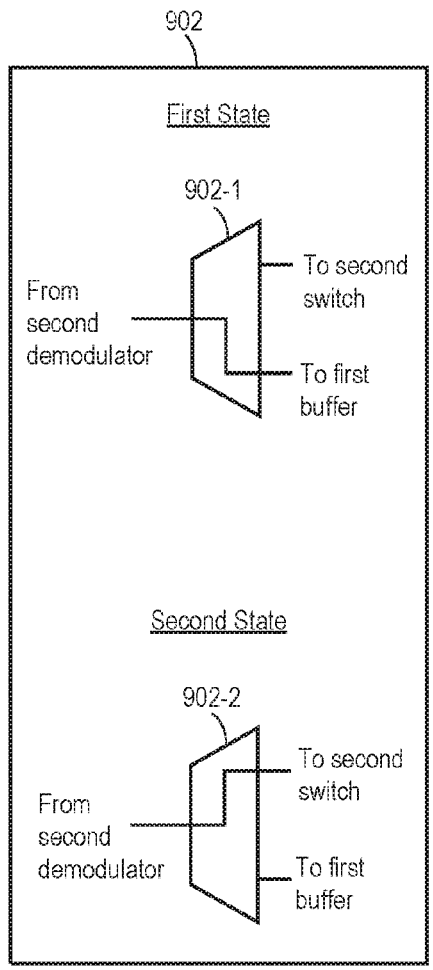
FIGS. 9A-9B are illustrative drawings representing a second logic circuit state machine that includes second selection circuitry that transitions from a first selection state to a second selection state (FIG. 9A) and a corresponding state transition diagram representing decision logic circuitry for determining when to transition from the first state to the second state (FIG. 9B) in accordance with some embodiments.
Figure 9B:
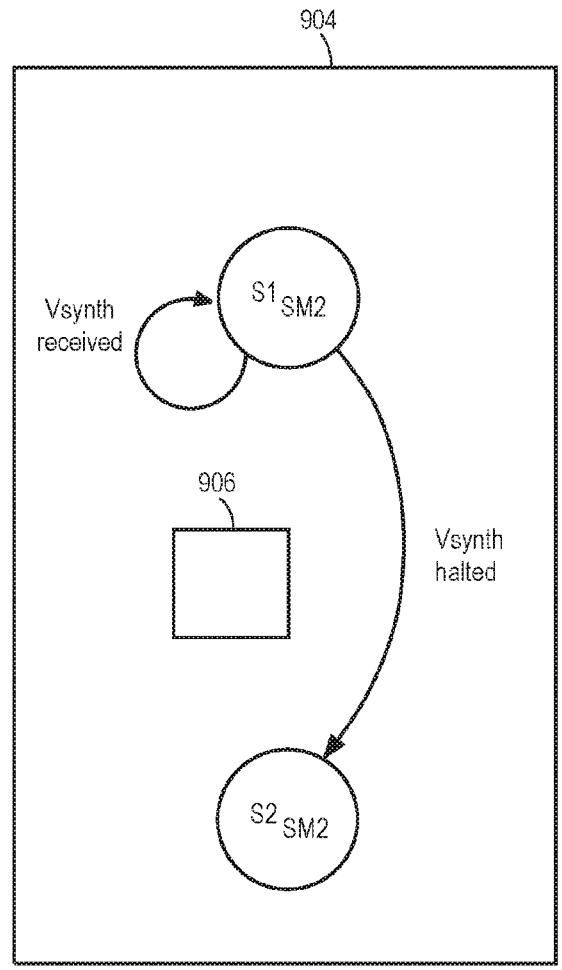

FIGS. 9A-9B are illustrative drawings representing a second logic circuit state machine (SM2) that includes second selection circuitry 902 that transitions from a first state 902-1 to a selection state 902-2 (FIG. 9A) and a corresponding state transition diagram representing decision logic circuitry 904 for determining when to transition from the first state to the second state (FIG. 9B) in accordance with some embodiments. The second logic circuit state machine (SM2) is disposed on the controller's secondary side 214, which powers up gradually during startup mode operation as charge on the output capacitor $C_{out}$ gradually increases with the gradually increasing level of the initialization signal, $V_{synth}$, resulting in a gradually increasing value of $V_{out}$. Referring to FIG. 9A, the second state machine includes a first demultiplex circuit that transitions from a first demultiplex state 902-1 to a second demultiplex state 902-2. The demultiplex circuit states 902-1, 902-2 include first and second output terminals that are coupled, respectively, to the gate of the second switch and to an input node of the first buffer. The demultiplex circuit states 902-1, 902-2 include an input node coupled to receive an analog output signal provided by the second demodulator. The first demultiplex circuit is in the first demultiplex state 902-1 when startup commences. Referring to FIG. 9B, state control logic $S1_{SM2}$ configures the first demultiplexer state 902-1 while the second modulator outputs the $V_{synth}$ signal. The first demultiplex state 902-1 couples the second modulator output signal to the input node of the first buffer. State control logic $S2_{SM2}$ includes detection circuitry 906 to detect whether the initialization signal $V_{synth}$ is received and to causes a transition to the second demultiplex state 902-2 in response to the secondary side no longer receiving the $V_{synth}$ signal. The first demultiplex state 902-1 couples the second modulator output signal to the gate of the second switch. In accordance with some embodiments, the state machine detects that the demodulator no longer outputs the $V_{synth}$ by for example, using a different transmission frequency.

Figure 10A:
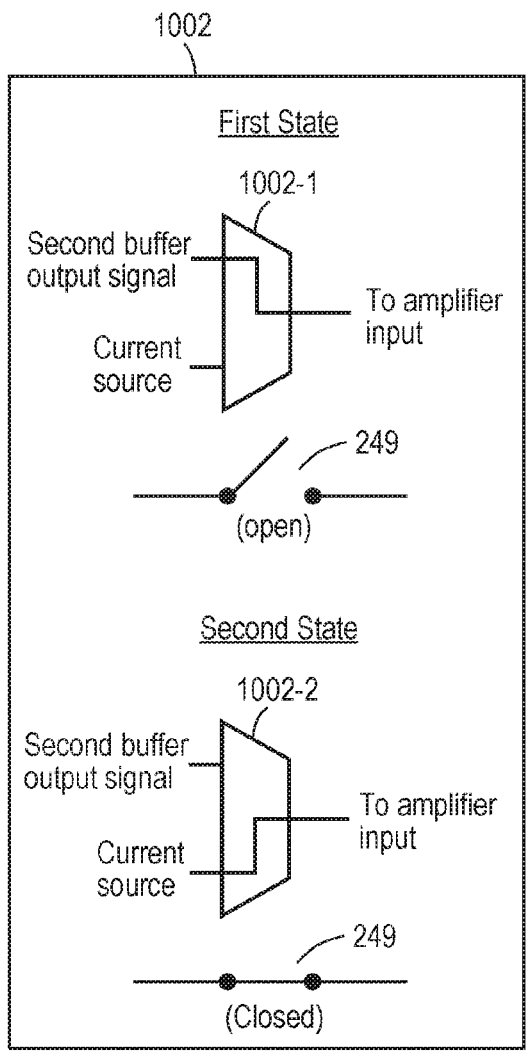
FIGS. 10A-10B are illustrative drawings representing a third logic circuit state machine that includes third selection circuitry that transitions from a first selection state to a second selection state (FIG. 10A) and a corresponding state transition diagram representing decision logic circuitry for determining when to transition from the first state to the second state (FIG. 10B) in accordance with some embodiments.
Figure 10B:
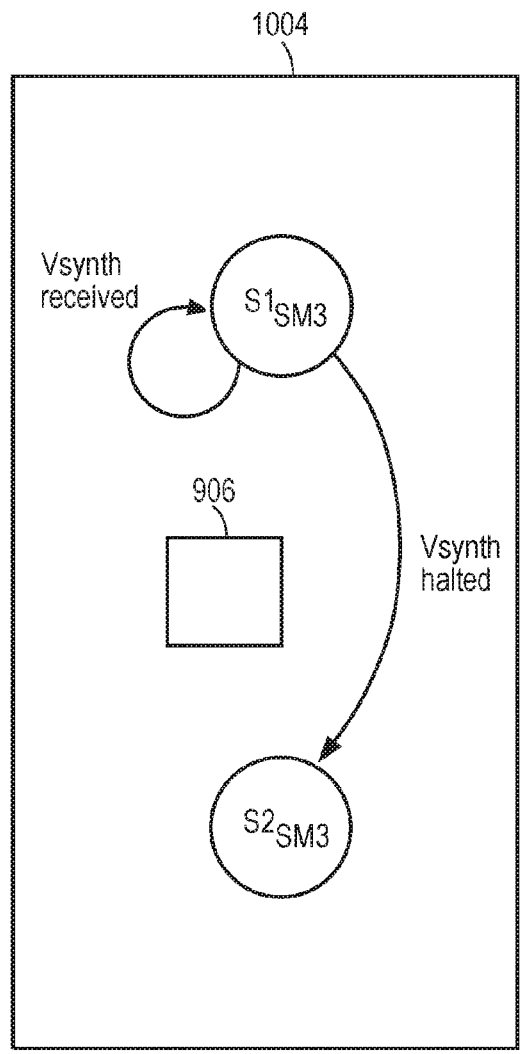

FIGS. 10A-10B are illustrative drawings representing a third logic circuit state machine (SM3) that includes third selection circuitry 1002 that transitions from a first state 1002-1 and switch 249 opened to a second state 1002-2 and switch 249 closed (FIG. 10A) and a corresponding state transition diagram representing decision logic circuitry 1004 for determining when to transition from the first state to the second state (FIG. 10B) in accordance with some embodiments. The third logic circuit state machine (SM3) is disposed on the controller's secondary side 214. Referring to FIG. 10A, the third state machine includes a second multiplex switch circuit that transitions from a first multiplex state 1002-1 to a second multiplex state 1002-2. The multiplex circuit states 1002-1, 1002-2 include first and second input terminals that can be coupled, respectively, to receive a voltage signal output by the second buffer and to receive an $I_{ref}$ current source signal. The multiplex circuit states 1002-1, 1002-2 include an output node coupled to provide a selected signal from its input nodes to the amplifier's second input node. The second multiplex circuit is in the first multiplex state 1002-1 and switch 249 opened when startup commences. Referring to FIG. 10B, state control logic $S1_{SM3}$ configures the second multiplexer state 1002-1 and switch 249 opened (decoupling amplifier 230 from conductor 250) to output the second buffer output voltage signal while $V_{synth}$ continues to be received. State control logic $S2_{SM3}$ includes the detection circuitry 906 to detect whether the initialization signal, $V_{synth}$, is received and to cause a transition to the second multiplexer state 1002-2 and switch 249 closed (coupling amplifier 230 to conductor 250) in response to halt in receiving the $V_{synth}$ signal.

FIGS. 11A-11B are illustrative drawings representing a fourth logic circuit state machine (SW) that includes fourth selection circuitry 1102 that transitions from a first state 1102-1 to a second state 1102-2 (FIG. 11A) and a corresponding state transition diagram representing decision logic circuitry 1104 for determining when to transition from the first state to the second state (FIG. 11B) in accordance with some embodiments. The fourth logic circuit state machine (SM4) is disposed on the controller's secondary side 214. Referring to FIG. 11A, the fourth state machine includes a third multiplex switch circuit that transitions from a first multiplex state 1102-1 to a second multiplex state 1102-2. The multiplex circuit states 1102-1, 1102-2 include first and second input terminals that can be coupled, respectively, to receive a dummy voltage signal and the $V_{comp}$ signal provided on the amplifier's output conductor line. In some embodiments, the dummy voltage signal is a signal that is selected to not be recognized by the primary side as a valid version of $V_{comp}$ to compare with $V_{synth}$. For example, the dummy voltage signal may be a distorted version of the $V_{comp}$ signal or may be 0V. The multiplex circuit states 1102-1, 1102-2 include an output node coupled to provide a selected signal from its input nodes to an analog signal input node of the first modulator circuit 234. The third multiplex circuit is in the first multiplex state 1102-1 when startup commences. Referring to FIG. 11B, state control logic $S1_{SM4}$ configures the third multiplexer state 1102-1 to output the dummy voltage signal to the input of the first modulator while $V_{soft\text{-}start}$ is less than $V_{out}$. State control logic $S2_{SM4}$ includes comparison circuitry 1106 to compare $V_{soft\text{-}start}$ with $V_{out}$ and to cause a transition to the second multiplexer state 1102-2, in which the $V_{comp}$ feedback signal is coupled to the input of the first modulator, in response to $V_{soft\text{-}start}$ substantially matching $V_{out}$ to within an acceptable circuit safety margin. The margin being such that the output moves an acceptably small amount when the loop is closed.

Figure 12A:
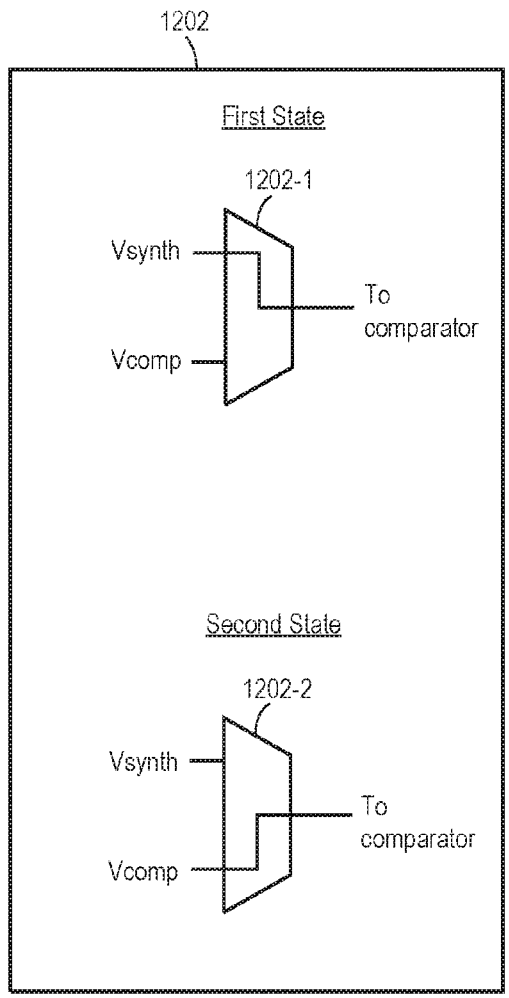
FIGS. 12A-12B are illustrative drawings representing a fifth logic circuit state machine that includes fifth selection circuitry that transitions from a first state to a second state (FIG. 12A) and a corresponding state transition diagram representing decision logic circuitry for determining when to transition from the first state to the second state (FIG. 12B) in accordance with some embodiments.
Figure 12B:
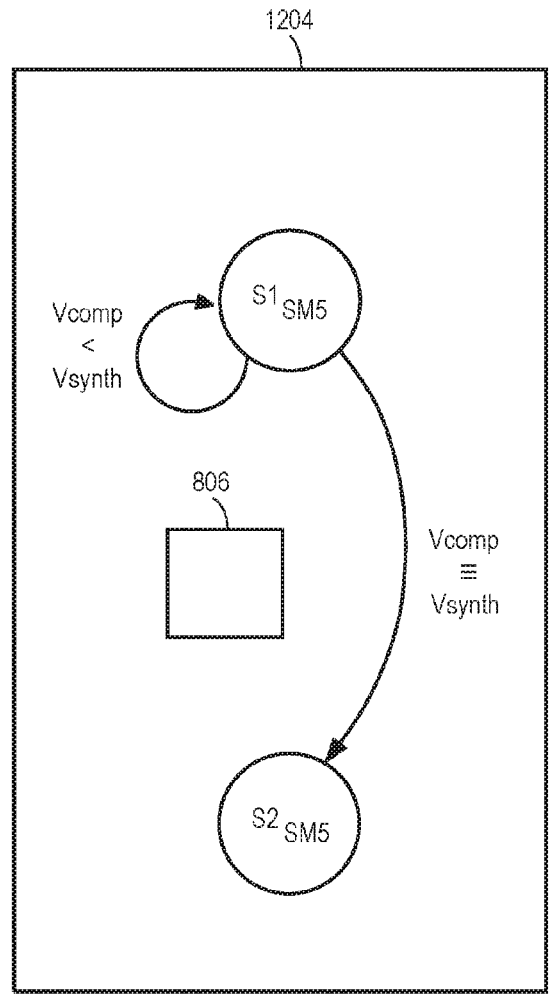

FIGS. 12A-12B are illustrative drawings representing a fifth logic circuit state machine (SM5) that includes fifth selection circuitry 1202 that transitions from a first state 1202-1 to a second state 1202-2 (FIG. 12A) and a corresponding state transition diagram representing decision logic circuitry 1204 for determining when to transition from the first state to the second state (FIG. 12B) in accordance with some embodiments. The fifth logic circuit state machine (SM5) is disposed on the controller's primary side 206. Referring to FIG. 12A, the fifth state machine includes a fourth multiplex switch circuit that transitions from a first multiplex state 1202-1 to a second multiplex state 1202-2. The multiplex circuit states 1202-1, 1202-2 include first and second input terminals that can be coupled, respectively, to receive the $V_{synth}$ voltage signal and the $V_{comp}$ voltage signal The multiplex circuit states 1202-1, 1202-2 include an output node coupled to provide a selected signal from its input nodes to the second input node of the comparator. The third multiplex circuit is in the first multiplex state 1202-1 when startup commences. Referring to FIG. 12B, state control logic $S1_{SM5}$ configures the third multiplexer state 1202-1 to initially provide the $V_{synth}$ signal to the comparator 228 while a voltage level of the feedback $V_{comp}$ signal is less than a voltage level of the initialization signal, $V_{synth}$. State control logic $S2_{SM5}$ includes the comparison circuitry 806 to compare the $V_{comp}$ feedback signal with the $V_{synth}$ signal and to cause a transition to the second multiplexer state 1202-2 in response to $V_{synth}$ matching $V_{comp}$ to within an acceptable circuit safety margin, e.g., a margin that is small enough that it will not cause a radical change in output voltage.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to control a switched mode voltage converter that includes a transformer providing a primary winding on a first side of a galvanic isolation medium and a secondary winding on the second side of the galvanic isolation medium, the control circuit comprising:
   during steady state,
      at the primary winding side, comparing the initialization signal with a first signal having a value indicative of a current in the primary winding to control a switch operatively disposed between a voltage source and the primary side winding;
   during startup,
      transmitting an initialization signal over the galvanically isolating communication medium from the primary winding side to the secondary winding side of the transformer;
      at the secondary winding side, providing the initialization signal to charge the feedback line;
      at the secondary winding side, charging a reference signal at a reference voltage capacitor;
      in response to a match between the reference signal and a secondary winding output signal, transmitting the signal at the feedback line over the galvanically isolating communication medium from the secondary winding side to the primary winding side;
      at the primary winding side, comparing the initialization signal with the signal at the feedback line transmitted over the galvanically isolating communication medium; and
      halting the initialization signal in response to a match between the initialization signal and the signal at the feedback line transmitted over the galvanically isolating communication medium.

2. The method of claim 1 further including:
   during startup, increasing a magnitude of the initialization signal with time.

3. The method of claim 1,
wherein charging the reference signal includes charging in response to the secondary winding output signal.

4. The method of claim 1,
wherein transmitting the initialization signal over the galvanically isolating communication medium from the primary side to the secondary side includes transmitting using a pulse width modulated signal; and
wherein transmitting the signal at the feedback line over the galvanically isolating communication medium from the secondary side to the primary side includes transmitting using a pulse width modulated signal.

5. A control circuit for a switched mode voltage converter that includes a transformer providing a primary winding on a first side of a galvanic isolation medium and a secondary winding on a second side of the galvanic isolation medium, the control circuit comprising:
an initialization signal source on the first side and configured to provide an initialization signal;
a switch, on the first side, coupled to the primary winding;
a switch control circuit, on the first side, coupled to and configured to control the switch using a comparison of a primary winding parameter with one of the initialization signal during startup and a feedback signal received from the second side during steady state operation; and
a feedback signal generator circuit, on the second side, configured to provide the feedback signal during steady state operation based on a comparison of a reference voltage signal and an output on the second side of the converter.

6. The control circuit of claim 5 further including:
a logic circuit to switch, during startup, from selecting the initialization signal to selecting the feedback signal in the comparison with the primary winding parameter, in response to the feedback signal matching the initialization signal.

7. The control circuit of claim 5 further including:
a first modulator on the second side and a first demodulator on the first side, to couple a signal across the galvanic isolation medium from the first modulator to the first demodulator; and a logic circuit to switch, during startup, from decoupling the feedback signal from
the first modulator to coupling the feedback signal to the first modulator, in response to the reference voltage signal matching the output voltage.

8. The control circuit of claim 5 further including:
a first modulator on the second side and a first demodulator on the first side, to couple a signal across the galvanic isolation medium from the first modulator to the first demodulator; and
a logic circuit to switch, during startup, from selecting a dummy signal to selecting the feedback signal to provide to the first modulator, in response to the reference voltage signal matching the output voltage.

9. The control circuit of claim 5 further including:
a second modulator on the first side and a second demodulator on the second side, to couple a signal across the galvanic isolation medium from the second modulator to the second demodulator; and
a logic circuit to switch, during startup, from coupling the initialization signal to the second modulator to decoupling the initialization signal from the second modulator, in response to the feedback signal matching the initialization signal.

10. The control circuit of claim 5 further including:
a reference current source to charge a reference capacitor during steady state operation; and
a logic circuit to switch, during startup, from selecting the output voltage to selecting the reference current source, to provide the reference voltage signal, based upon the feedback signal matching the initialization signal.

11. The control circuit of claim 5 further including:
a reference current source to charge a reference capacitor during normal operation;
a second modulator on the first side and a second demodulator on the second side, to couple a signal across the galvanic isolation medium from the second modulator to the second demodulator;
a logic circuit to switch, during startup, from coupling the initialization signal to the second modulator to decoupling the initialization signal from the second modulator, in response to the feedback signal matching the initialization signal; and p1 a logic circuit to switch, during startup, from selecting the output voltage to selecting the reference current source, to provide the reference voltage signal, in response to decoupling the initialization signal from the second modulator.

12. The control circuit of claim 5 further including:
a logic circuit to switch, during startup, from decoupling an output of the feedback signal generator circuit from an integrating capacitor to coupling the output of the feedback signal generator circuit to the integrating capacitor, based upon the feedback signal matching the initialization signal.

13. The control circuit of claim 5 further including:
a selection circuit on the first side, operative during startup, to select between providing the initialization signal and providing the feedback signal to the switch control circuit based upon a comparison between them.

14. The control circuit of claim 5,
wherein the switch control circuit includes a comparator circuit.

15. The control circuit of claim 5, wherein the feedback signal generator includes a difference amplifier circuit.

16. A method to control a switched mode converter circuit to provide a secondary side output signal, wherein the converter circuit includes primary and secondary sides that are coupled using respective primary and secondary windings of a transformer, the method comprising:
at the primary side, controlling a switch to modulate a current in the primary winding of the transformer, the controlling based on a first feedback signal from the secondary side or on an initialization signal;
at the secondary side, during a converter startup phase, generating the first feedback signal based on the output signal and, during a converter steady-state phase, generating the first feedback signal based at least in part on a reference signal source; and
transitioning from the startup phase to the steady-state phase in response to the first feedback signal substantially matching the initialization signal during the startup phase.

17. The method of claim 16, further comprising generating the initialization signal using a signal generator on the primary side.

18. The method of claim 17, wherein the generating the initialization signal includes using a digital to analog converter circuit to provide the initialization signal.

19. The method of claim 16, further comprising transmitting the first feedback signal from the secondary side to the primary side using a pulse width modulated signal.

20. The method of claim 16, further comprising:
using a first comparator circuit, during the converter startup phase, comparing a magnitude of the first feedback signal with a magnitude of the initialization signal and transitioning from the startup phase to the steady-state phase in response to the magnitude of the first feedback signal substantially matching the magnitude of the initialization signal.

21. The method of claim 16, wherein the controlling the switch includes, during the steady state phase, using a second comparator circuit to provide a control signal to the switch based on the first feedback signal and on an indication of a current signal in the primary winding.

22. The method of claim 16, wherein the generating the first feedback signal includes using a difference amplifier configured to provide a difference signal based on an output of the secondary side and one of a reference signal and a buffered version of the output of the secondary side.

23. The method of claim 16, further comprising, during startup, increasing a magnitude of the initialization signal with time.

24. The method of claim 16, further comprising transmitting the initialization signal from the primary side to the secondary side using a pulse width modulated signal.

25. The control circuit of claim 5, further comprising:
a first charging circuit, on the second side, configured to provide the reference voltage signal in response to the output during startup, and in response to an external reference during steady state operation.

* * * * *

UNITED STATES PATENT AND TRADEMARK OFFICE
CERTIFICATE OF CORRECTION

PATENT NO. : 9,882,493 B2
APPLICATION NO. : 15/146635
DATED : January 30, 2018
INVENTOR(S) : Daly et al.

Page 1 of 1

It is certified that error appears in the above-identified patent and that said Letters Patent is hereby corrected as shown below:

In the Claims

In Column 12, Lines 38-39, Claim 1, delete "the initialization signal" and insert --a signal provided at a feedback line and transmitted over a galvanically isolating communication medium-- therefor Column 13, Line 1, Claim 3, after "claim 1,", delete "¶"

Column 13, Line 4, Claim 4, after "claim 1,", delete "¶"

Column 13, Line 43, Claim 7, after "and", insert --¶--

Column 13, Line 45, Claim 7, after "from", delete "¶"

Column 14, Line 19, Claim 11, delete "and p1" and insert --and¶-- therefor

Column 14, Line 36, Claim 14, after "claim 5,", delete "¶"

Signed and Sealed this
Fourth Day of June, 2019

Andrei Iancu
*Director of the United States Patent and Trademark Office*